S. L. ALLEN.
Seed Planter and Fertilizer.
No. 108,672.
Patented Oct. 25, 1870.
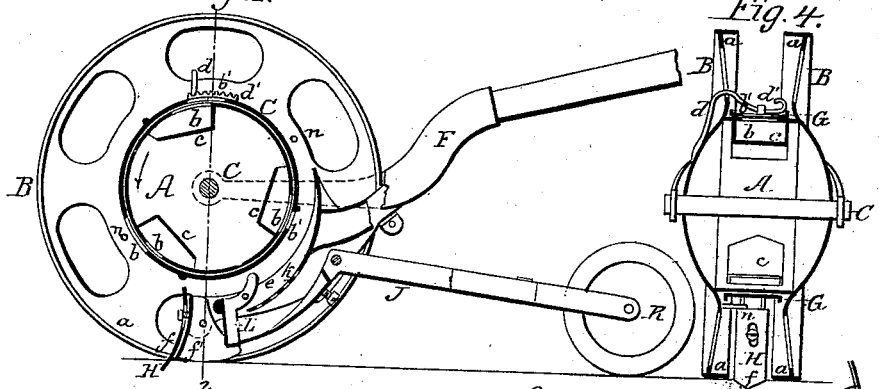
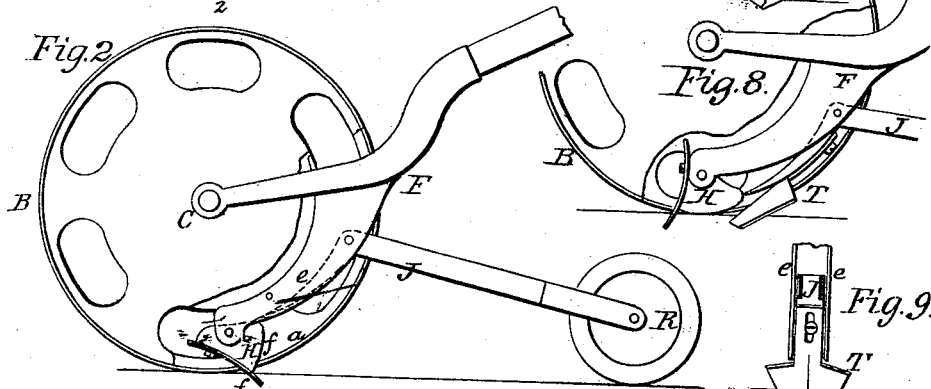
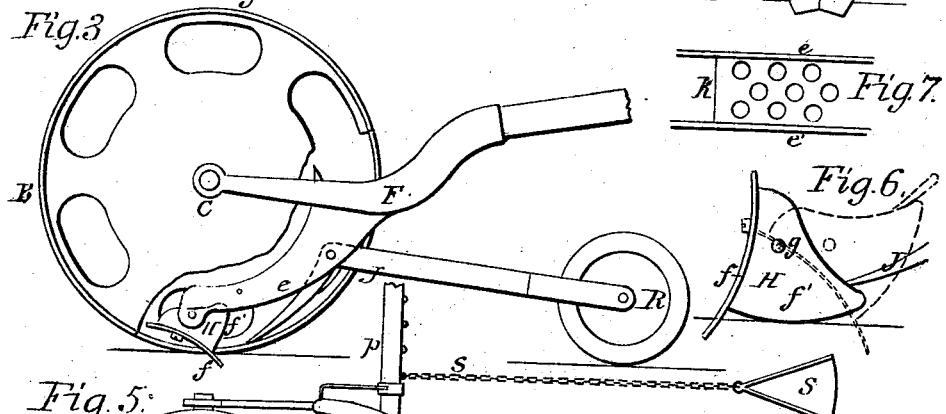
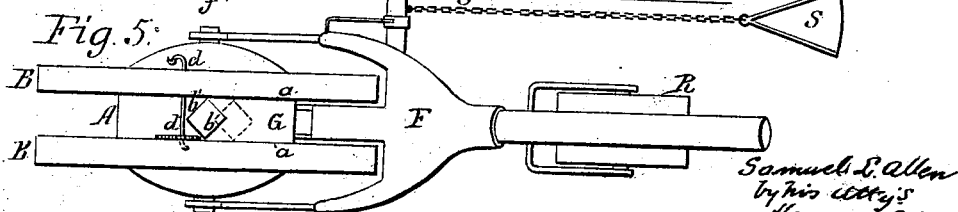

United States Patent Office.

SAMUEL LEEDS ALLEN, OF CINNAMINSON, NEW JERSEY.

Letters Patent No. 108,672, dated October 25, 1870.

IMPROVEMENT IN PLANTING AND FERTILIZING-MACHINES.

The Schedule referred to in these Letters Patent and making part of the same.

I, SAMUEL LEEDS ALLEN, of Cinnaminson, county of Burlington, State of New Jersey, have invented an Improved Planting and Fertilizing-Machine, of which the following is a specification.

Nature and Object of the Invention.

My invention consists of certain improvements in and additions to the planting and fertilizing-machine for which Letters Patent were granted to me on the 24th day of November, 1868, and reissued on the 9th day of August, A. D. 1870.

Description of the Accompanying Drawing.

Figure 1 is a vertical section of my improved planting and fertilizing-machine;

Figures 2 and 3, side views of the same in different positions;

Figure 4, a transverse vertical section on the line 1-2, fig. 1;

Figure 5, a plan view;

Figures 6 and 7, detached views, drawn to an enlarged scale; and

Figures 8 and 9, detached views of parts of the machine when the latter is arranged as a fertilizer.

General Description.

The reservoir A for the seed or manure, instead of being attached to or forming part of a single carrying-wheel, as in my reissued patent of August 9, 1870, is arranged concentrically upon and supported by two wheels, B B, which, on their inner sides, have broad flanges, a a, for a purpose described hereafter.

The reservoir and its wheels turn upon or with an axle, C, which is hung to the frame F, by which the machine may be pushed over the ground.

The reservoir has, in the present instance, three openings, b, for the discharge of the seed or fertilizer, arranged at equal distances apart, and each opening being covered within the reservoir by a bucket, c, open at one end, and arranged to conduct the seed to the openings, in the manner fully described in aforesaid reissued patent.

The exterior of the reservoir between the wheels is covered by an annular slide, G, in which are openings b', corresponding in number and position with the openings b of the reservoir, and by which the latter may be more or less opened, or entirely closed, as desired, on turning the annular slide upon the reservoir.

The slide when adjusted is retained by a spring, d, secured to the side of the reservoir, and adapted to a ratchet or serrated plate, d', on the slide.

The furrow for receiving the droppings from the machine is formed by a plow, H, hung to arms e of the frame F, beneath the reservoir and between the wheels B of the machine.

This plow consists of plates f and f', the former being adjustable upon the latter, so as to regulate the depth of the furrow, and the plow, when in operation, is prevented from turning upon its pivot g by the curved short arm of a lever, J, hung to the frame F, and which bears against the rear curved edge of the plate f' of the plow, (see fig. 6.)

If the plow, when in operation, should strike a stone or other obstruction, or become clogged with grass, &c., it can be tilted so as to pass over the obstruction in the one case, or so as to free it in the other case by either raising or lowering the handles of the frame F.

The raising of the frame will lift the short arm of the lever J from contact with the rear curved edge of the plow, thus freeing the latter and permitting it to turn upon its pivot, as shown in fig. 2, and by dotted lines in fig. 6, and the lowering of the frame will in like manner remove the end of the lever from the curved rear edge of the plow and permit the latter to turn, as shown in fig. 3.

The plow will also turn and offer no resistance to the motion of the machine when the latter is drawn backward, but, when the machine is in operation, the plow will always be held rigidly and prevented from turning so long as the lever J bears against its rear curved edge.

When the machine is moved forward over the ground and the reservoir turned in the direction of the arrow, fig. 1, the seed or fertilizer will drop from each of the openings b successively upon a curved conductor, k, arranged between the arms e of the frame F.

From this conductor, which is perforated with a number of staggered holes, as best observed in fig. 7, the grain drops onto the curved short arm of the lever J, which serves as a spout to conduct the grain into a small lever-like receptacle, L, hung to the arms e of the frame at the rear, but in such a position as not to interfere with the motions of the plow.

The seed, which thus accumulates in the receptacle L, is discharged from the same into the furrow formed by the plow, by tilting or overturning the said receptacle by means of pins n, on the inner side of one of the wheels. There are two of these pins n in the present instance, so that seed may be planted in two hills during every complete revolution of the machine.

The earth thrown up by the plow in forming the furrow for the reception of the seed is received upon the inner flanges a a of the wheels and is carried upward by the latter and again dropped into the furrow after the planting of the seed, and this loose earth is packed down, as the machine moves forward, by a roller, R, hung to the rear end of the lever J.

Although I prefer to use two flanges arranged on each side of the plow, as above described, a good result can be obtained by the use of a single wheel having a flange on the side adjacent to the plow.

If desired, the receptacle L may also be tilted at the will of the attendant by means of a cord or wire attached to the same.

A marker, S, consisting of a triangular plate to be dragged over the ground, and attached by a chain or cord to a bar, p, secured to one side of the frame F, enables the position of the succeeding furrow to be marked as the machine is moved forward over the furrow formed by the plow.

The bar p of the marker is furnished with a number of hooks or rings, to any one of which the chain can be attached, this enabling the distance of the marker from the machine and the consequent width of the space between the furrows to be regulated as desired. The marker, when not required for use, can be readily detached from the machine.

When it is desired to discharge the seed continuously into the furrow instead of planting it in hills, as above described, the receptacle L is detached, in order that the seed may fall directly from the conductor k and end of the lever J into the furrow. In such case the perforated conductor k acts, in a measure, as a sieve, owing to its staggered holes, in spreading the seed and insuring a uniform distribution of the same.

When the machine is used for spreading fertilizers, the receptacle L may or may not be detached, and an adjustable spreading-plate, T, (figs. 8 and 9,) is secured to the under side of the short arm of the lever J, so that as the particles fall through the holes in and from the end of the conductor k onto the said plate T, they may be uniformly spread by the same across the furrow.

Claims.

1. The annular slide G, adapted to the exterior of the reservoir A, having openings corresponding to the openings b in the same, in combination with the spring d, for securing the slide in any position to which it is adapted, all substantially as described.

2. The plow H, pivoted to the frame F of the machine and controlled by a lever, J, also hung to the frame of the machine, and adapted to the rear edge of the plow, all substantially as specified.

3. The perforated conductor k, arranged in respect to the reservoir A, substantially as herein described.

4. The combination, with the said conductor, and with the curved short arm of the lever J, of the receptacle L.

5. The receptacle L, pivoted to the frame of the machine and arranged to be tilted, substantially as described.

6. The combination, with the perforated conductor k, of a spreading-plate, T.

7. The lever J, connected at the extremity of its long arm to a roller, R, and having a curved short arm adapted to the three-fold purpose of supporting the plow H, of serving as a conductor for the seed or fertilizer, and as a medium for the attachment of the spreading-plate T.

8. In combination with the within-described machine, the adjustable and detachable marker S.

9. The combination of a plow, and a flanged wheel or wheels, as described.

In testimony whereof, I have signed my name to this specification in the presence of two subscribing witnesses.

SAMUEL LEEDS ALLEN.

Witnesses:
WM. A. STEEL,
F. B. RICHARDS.